Jan. 27, 1925.                                                                                1,524,426
                              R. Z. FARMER
                                  BRAKE
              Original Filed March 9, 1921        3 Sheets-Sheet 3
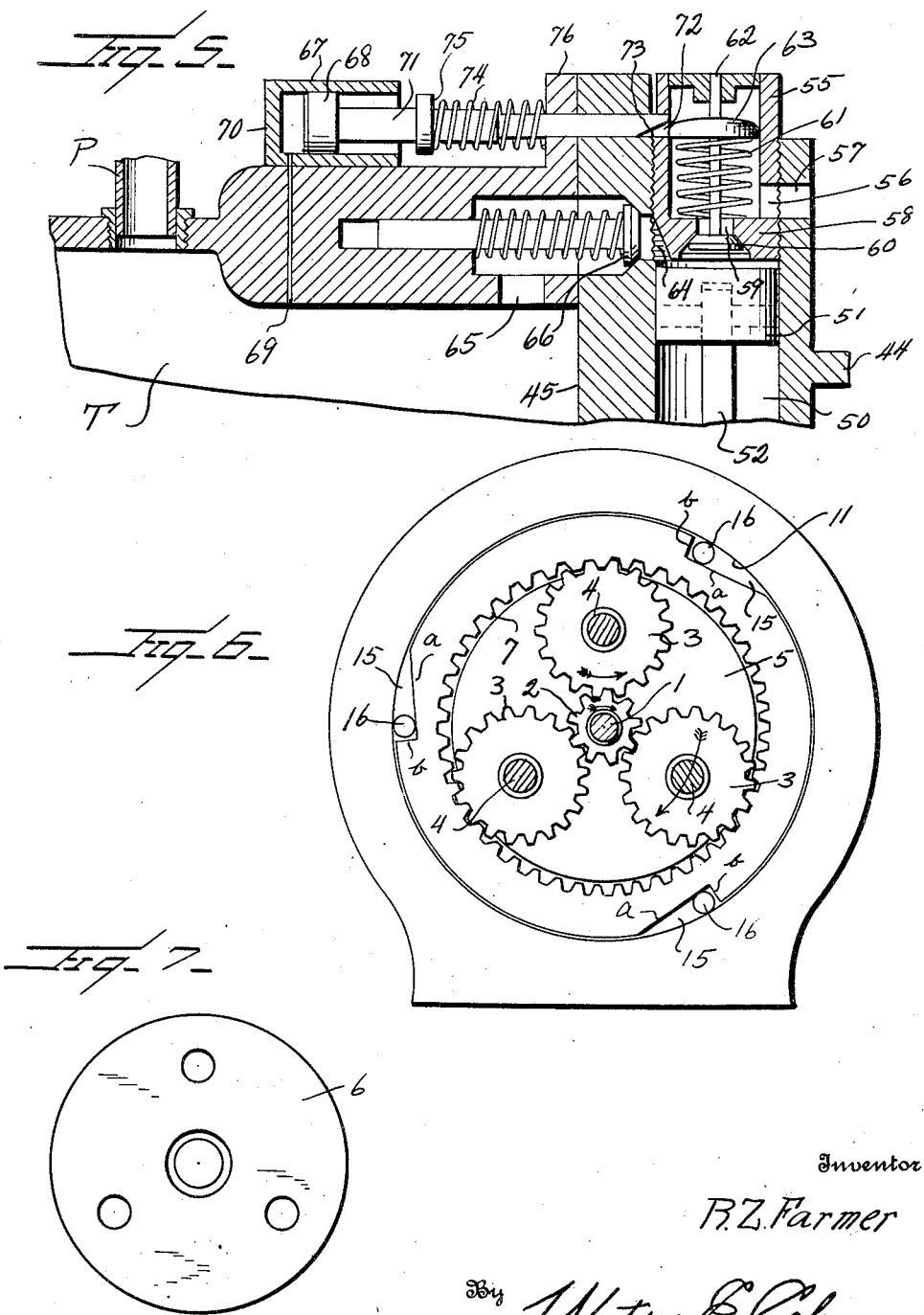
Inventor
R. Z. Farmer
By Watson E. Coleman
Attorney Patented Jan. 27, 1925.

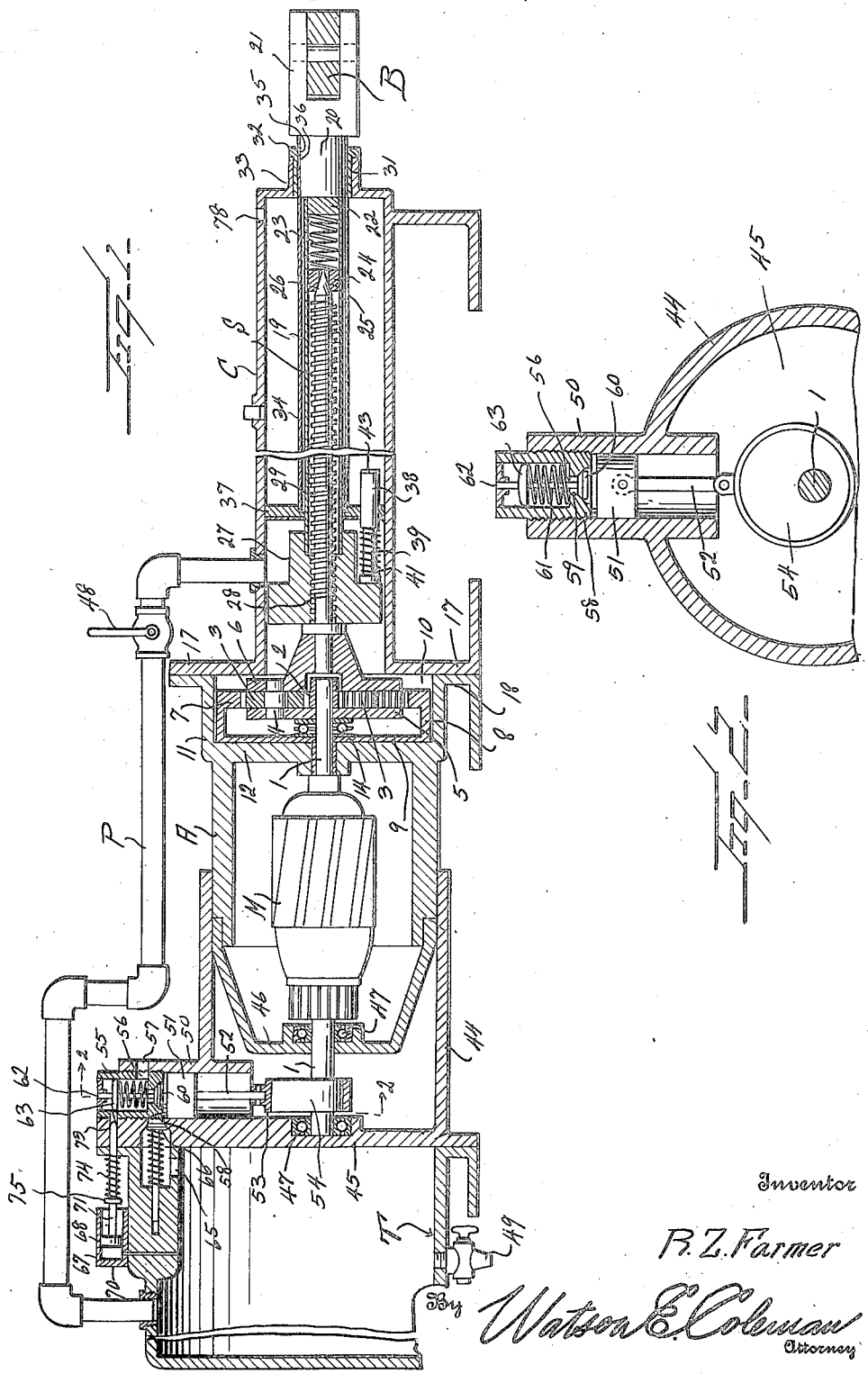

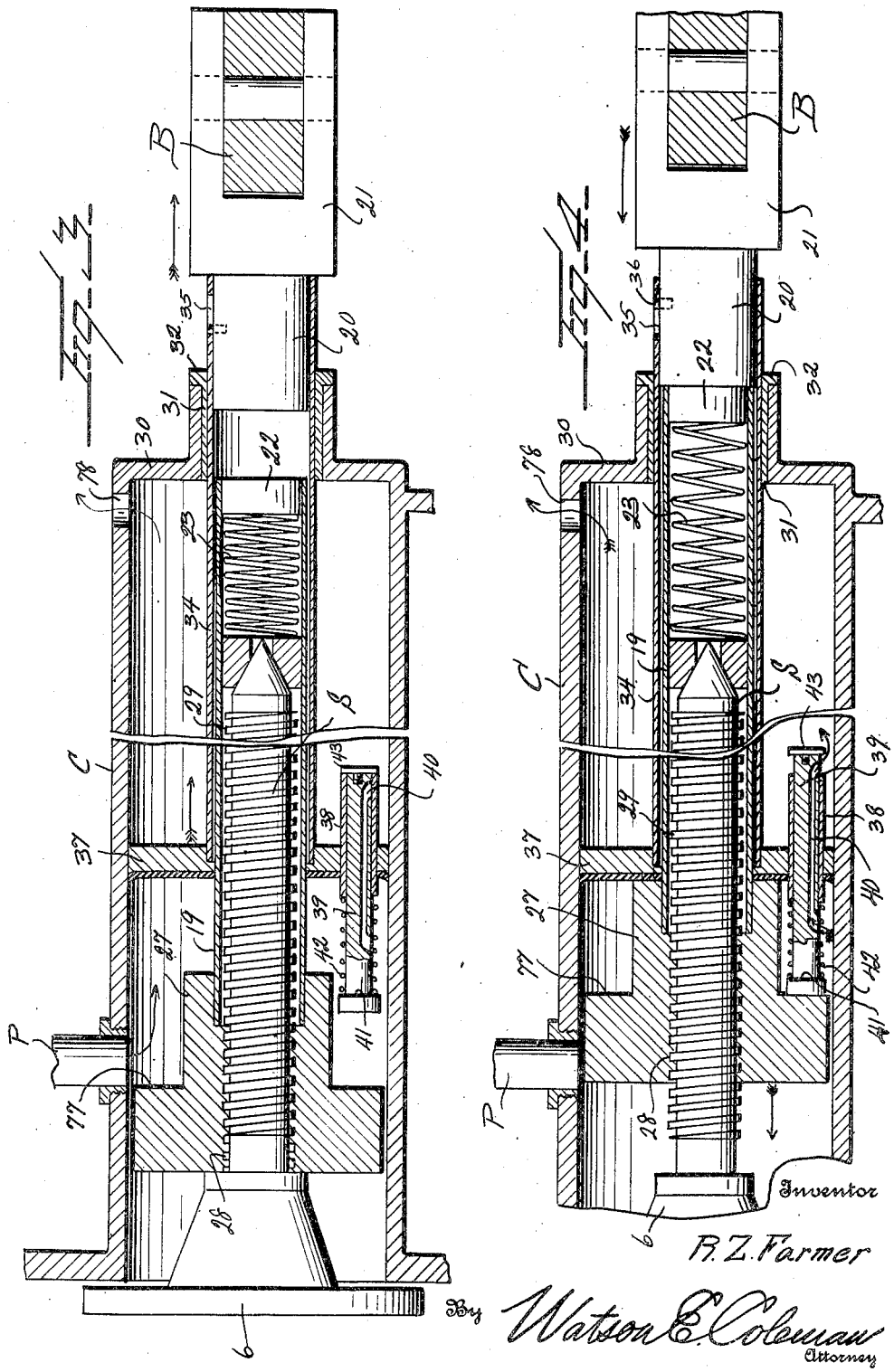

1,524,426

UNITED STATES PATENT OFFICE.

ROBERT Z. FARMER, OF PORTLAND, OREGON, ASSIGNOR TO AUTOMATIC ELECTRIC BRAKE COMPANY, OF PORTLAND, OREGON, A CORPORATION OF OREGON.

BRAKE.

Application filed March 9, 1921, Serial No. 451,029. Renewed October 16, 1924.

*To all whom it may concern:*

Be it known that I, ROBERT Z. FARMER, a citizen of the United States, residing at Portland, in the county of Multnomah and State of Oregon, have invented certain new and useful Improvements in Brakes, of which the following is a specification, reference being had to the accompanying drawings.

This invention relates to certain improvements in brakes and it is an object of the invention to provide a brake of this general character which is normally adjusted into either set or released position through the instrumentality of a motor and wherein fluid means are provided to set the brake during a period in which the motor may be inoperative.

Another object of the invention is to provide a novel and improved device of this general character embodying a motor normally operating to adjust the brake into either set or released position, together with fluid pressure operated means for setting the brake in an emergency, together with means operated by the motor for maintaining a desired supply of fluid under pressure.

An additional object of the invention is to provide a novel and improved brake wherein the prime mover comprises a motor and wherein means are provided operated by fluid under pressure to set the brake, said last named means being adapted for use in an emergency, the fluid, after the brake has been set under the influence of the fluid, being released upon a further setting of the brake by the motor.

The invention consists in the details of construction and in the combination and arrangement of the several parts of my improved brake whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a longitudinal sectional view, with portions in elevation, of a brake mechanism constructed in accordance with an embodiment of my invention;

Figure 2 is an enlarged fragmentary sectional view taken substantially on the line 2—2 of Figure 1, with certain of the parts in elevation;

Figure 3 is an enlarged longitudinal sectional view, with portions in elevation, of the forward portion of the mechanism as illustrated in Figure 1, showing the shackle in a set position under the influence of a fluid under pressure;

Figure 4 is a view similar to Figure 3, showing certain of the parts in a second position to release the fluid pressure;

Figure 5 is an enlarged fragmentary view illustrating in detail the mechanism herein disclosed for maintaining the desired supply of fluid under pressure;

Figure 6 is a view partly in elevation and partly in section illustrating the operative connection between the armature shaft and the internal gear as herein disclosed; and Figure 7 is a view in rear elevation of the plate or head carried by the inner end portion of the screw shaft.

As disclosed in the accompanying drawings, my improved device or mechanism is shown in operative engagement with the fulcrum bar B of a draft rigging of the type now generally employed in connection with trolley cars or the like, but it is to be understood that the present invention is not limited to this particular use as the same may be employed with equal advantage in connection with the brake mechanism of an automobile or in connection with any movable member adapted to be operated or moved in opposite directions at will.

In the present embodiment of my invention, A denotes a hollow or tubular member of suitable dimensions and configuration and in which is arranged a motor M of an electrical type and which motor is adapted to be rotated in reverse directions as required through the instrumentality of a reversing switch interposed in the operating circuit (not shown) for the motor.

The armature or driving shaft 1 of the motor has its opposite end portions extending exteriorly of the member A through the end heads thereof. Fixed to the forward extended end portion of the armature driving shaft 1 is a pinion 2 meshing with the gears 3 preferably equidistantly spaced in a direction circumferentially of the pinion 2.

Each of the gears 3 is mounted upon a shaft or axle 4 supported by the disc or plate 5 and the disc or head 6. The disc or plate 5 is loosely mounted upon the adjacent end portion of the armature or driving shaft 1 while the disc or head 6 is fixed to an adjacent end portion of a threaded shaft S to be hereinafter more particularly referred to.

The gears 3 are arranged between the disc or plate 5 and the disc or head 6 and are also in mesh with an internal or orbit gear 7. This gear 7 is carried by the peripheral flange 8 defining the disc or plate 9 also loosely mounted upon the adjacent end portion of the armature or driving shaft.

The disc or plate 9 and the flange 8 thereof substantially snugly fit within a chamber 10 provided by the forwardly directed annular flange 11 which substantially defines the adjacent head 12 of the member A. Interposed between the discs or plates 5 and 9 and surrounding the adjacent end portion of the armature or driving shaft 1 is a thrust bearing 14.

As is particularly illustrated in Figure 6, the peripheral wall or face of the flange 8 is provided with the recesses 15. The bottom wall $a$ of each of the recesses 15 is chordal to the periphery of the disc or plate 9 and terminates at its inner end in the radially directed shoulder $b$. Arranged within each of the recesses 15 is a roller 16 which operate to normally maintain the plate or disc 9 against rotation.

When the shaft 1 is rotated in a direction to cause the shaft S to adjust the brake into set position, as will be hereinafter more particularly set forth, the rollers 16 serve to hold the disc or plate 9 against rotation. When the shaft 1 is rotated in the opposite direction to effect a release of the brake, said rollers 16 will also operate to hold the plate or disc 9 against rotation, but when the brake is in full release or other undue obstruction or hindrance offered to the rotation of the shaft S through the coacting gears 2, 3 and 7, the rollers 16 will assume a position adjacent shoulders $b$, whereupon the disc or plate 9 will rotate with the shaft 1, resulting in the shaft S remaining stationary or non-rotating. When the motor M is operating with the brake in full release, or when the disc or plate 9 is rotating, the rollers 16 will serve as roller bearings.

C denotes an elongated cylindrical casing having its inner end open, said inner open end being defined by the outstanding flange 17 adapted to be secured in any desired manner to the outstanding flange 18 defining the free marginal portion of the flange 11 hereinbefore referred to.

The shaft S, hereinbefore referred to, which is in axial alinement with the armature or driving shaft 1 extends inwardly of the casing C and also within a tubular piston 19. The tubular piston 19 is of a length to terminate adjacent the end of the casing C remote from the member A and is adapted normally to abut the inner end of the shank 20 of the shackle 21. The shackle 21 is operatively engaged in a conventional manner with the beam B hereinbefore referred to. The shank 20 is adapted to have endwise movement relative to the casing C and in a manner which will be hereinafter more particularly set forth.

Fixed within the forward end portion of the tubular piston 19 or that end portion of the piston adjacent the shank 20 of the shackle 21 is a block or head 22. Bearing against the block or head 22 is an expansible member 23 herein disclosed as a coil spring. The member 23 also bears against a block 24 snugly engaging within the outer end portion of the tubular piston 19 but having movement in a direction lengthwise of said piston 19.

The block 24 is provided with a substantially conical bearing or recess 25 to receive the tapered or conical portion 26 of the adjacent or inserted end of the shaft S. The block 24 serves as a support for the inserted end portion of the shaft S whereby said shaft is maintained or lined up in dead center of the piston 19. The expansible member or spring 23 permits the block 24 to have yieldable movement and this is of particular advantage to prevent jamming and particularly when the brake is in full release.

The opposite end portion of the tubular piston 19 or that end portion opposed to the member A is provided with a head or nut 27 provided with the internal square thread 28 coacting with the square thread 29 of the shaft S and which thread 29 extends throughout the major portion of the length of said shaft. The nut or head 27 is non-rotatable and the thread 28 of the nut or head 27 is at all times engaged with the thread 29 of the shaft S. The nut or head 27 may be held against rotation in any desired manner as by having the bore of the casing C angular in cross section and the head or nut 27 similarly formed.

The outer end of the casing C is closed by the head 30 having a central opening 31 lined by the bushing 32. The opening 31 is defined by an outstanding flange 33 which is also lined by the bushing 32 just referred to. Extending through the bushing 32 and snugly fitting therein is an end portion of a supplemental tubular piston 34. The major portion of the piston 34 is arranged within the casing C and the tubular piston 19 telescopes within the piston 34. The outer end portion of the piston 34 is provided in its wall with a longitudinally disposed slot 35 in which extends an outstanding pin or part 36 carried by the shank 20 of the shackle 21, said shank 20 snugly fitting within the outer end portion of the piston 34. In view of this, it will be at once understood that the shank 20 and the piston 34 have limited movement one independently of the other in a direction axially of the piston 34 and the shank 20.

The inserted end portion of the piston 34 has fixed thereto a plunger or piston head 37 which snugly bridges the space between the opposed walls of the plunger 19 and casing C, said plunger also having movement lengthwise of the piston 19 and the casing C. The plunger 37 to one side of the pistons 19 and 34 has disposed therethrough a sleeve 38, and slidably disposed through the sleeve 38 is an air release valve 39. The valve 39 has disposed longitudinally thereof a port 40. When the valve 39 is in its normal position, the end of the port 40 to the forward side of the piston head or plunger 37 is closed by the sleeve 38 while the opposite end portion of the port 40 is at all times in communication with the pressure chamber at the rear side of the plunger or piston head 37.

The valve 39 is of a length greater than the length of the sleeve 38 and the rear end portion of the valve 39 is provided with an outstanding annular shoulder 41. Interposed between the shoulder 41 and the adjacent end of the sleeve 38 is an expansible member 42 herein disclosed as a coil spring encircling the adjacent end portion of the valve 39. The member or spring 42 operates to constantly urge the valve 39 inwardly so that normally the flow through the port 40 is closed. The movement of the valve 39 under the influence of the member or spring 42 is limited by the plate 43 suitably secured to the forward end of the valve 39 and which plate 43 is of a diameter in excess of the diameter of the valve 39 so that the marginal portion of the plate 43 will contact with the adjacent or forward end of the sleeve 38.

The rear portion of the member A is insertible within and suitably secured to a cylindrical member 44 having its outer or rear end closed by a head 45. The armature or driving shaft 1 is disposed through the rear head 46 of the member A and is also rotatably supported by the head 45. Coacting with the heads 45 and 46 and the adjacent portion of the shaft 1 are the antifriction members 47. Secured to the head 45 is a tank T of desired capacity and said tank is in communication through the pipe line P with the casing C rearwardly of the plunger or piston head 37.

Interposed in the pipe line P is a controlling valve 48 adapted to be operated in any desired manner by the driver of the vehicle, the valve 48 being conventionally indicated in Figure 1. As the particular means for operating the valve 48 forms no essential part of my present invention, a detailed description and illustration thereof is believed to be unnecessary.

In communication with the tank T through the lower wall thereof is a pet cock 49 which serves as a bleed to drain any condensed water from within the tank T. Formed with the wall of the member 44 and the head 45 is a radially disposed cylinder 50 in which is arranged for rectilinear movement a piston or plunger 51. The piston or plunger 51 is operatively engaged through the rod 52 with the strap 53. The strap 53 is associated with the eccentric 54 mounted upon the adjacent end portion of the armature or driving shaft 1 so that as said shaft rotates in either direction, the piston or plunger 51 will be reciprocated to function as an air compressor.

The upper end of the cylinder 50 is closed by a hollow plug 55, a side wall of said plug adjacent its lower end being provided with a port 56 registering with a port 57 in the wall of the cylinder 50, said registering ports 56 and 57 being in communication with the atmosphere. The lower wall or head 58 of the plug 55 is provided with a port 59 affording communication with the interior of the plug 55 and the cylinder 50 below said plug, so that as the piston or plunger 51 moves in one direction, air will be drawn into the cylinder 50 through the ports 56, 57 and 59.

A check valve 60 coacts with the port 59 and said valve 60 is normally maintained closed by the expansible member 61. The member 61 is herein disclosed as a coil spring surrounding the upstanding stem 62 carried by the valve 60 and interposed between the lower wall or head 58 of the plug 55 and a disc 63 carried by the upper portion of the stem 62. The lower portion of the plug 55 is provided in its periphery with a recess 64 which provides a passageway which affords communication between the cylinder 50 and the port 65. The port 65 is in communication with the interior of the tank T and the inner portion of the port 65 is enlarged to provide for the mounting of the normally closed check valve 66 to prevent retrograde flow of the fluid from the tank T back to the piston 50. As the piston 50 moves upwardly or toward the plug 55, the air drawn into the cylinder 50 is forced through the passageway 64 and port 65 into the tank T and this operation is continued until the air within the tank T is under desired pressure.

Mounted upon the top of the tank T is a horizontally disposed cylinder 67 having one end closed and mounted within said cylinder 67 for rectilinear movement is a piston 68. A restricted port 69 is in communication with the interior of the tank T and with the cylinder 67 between the closed end 70 thereof and the piston 68. Extending outwardly from the piston 68 is a rod 71. The rod 71 is slidably disposed through a marginal portion of the head 45 and the coacting portion or flange of the tank T and is adapted to be extended within the plug 55 through and opening 72 in the side wall of said plug.

The end portion of the rod 71 moving within the plug 55 is provided with the bevel or cam 73 adapted to ride over the disc 63 to move the valve 60 into open position and to hold the valve in such adjustment. The piston 68 and the coacting rod 71 are normally maintained retracted or at the limit of their movement inwardly of the cylinder 67 by the expansible member 74 herein disclosed as a coil spring surrounding the rod 71 and interposed between a shoulder 75 carried by the rod and an outstanding flange 76 of the tank T.

When the air pressure within the tank T rises above the tension of the member or springs 74, the piston 68 will be moved outwardly. As the piston 68 moves outwardly, the bevel or cam 73 of the rod 71 will ride over the disc 63 and move the valve 60 into open position, so that, as the piston 51 continues to reciprocate, the air drawn into the cylinder 50 through the members 56, 57 and 59 will be returned to the atmosphere through will be returned to the atmosphere through the same ports. When the pressure within the tank T is sufficiently reduced, the member or spring 74 automatically returns the piston 65 and the rod 71 to the limit of their inward movement, whereupon the rod 71, or more particularly the bevel or cam 73, is disengaged from the disc 63 and the expansible member or spring 61 will cause the valve 60 to return to its normal or closed position except upon the suction stroke of the piston 51.

Under normal conditions, the shackle 21 is moved into set or released position through the action of the motor M but in the event said motor should become inoperative, as by accidental breaking of the operating circuit therefrom or from any other cause, the valve 48 is moved into open position so that the shackle 21 may be moved outwardly to set the brake under the influence of the air pressure. When the valve 48 is opened, the air under pressure will pass from the tank T into the casing C rearwardly of the plunger or piston head 37, forcing said head or plunger 37 and the piston 34 outwardly.

When the operating circuit for the motor has again been closed, or the other trouble removed, said motor is operated to cause the piston 19 to move outwardly or in a set direction. Upon this movement, the outstanding shoulder 77 carried by the nut or head 27 will contact with the adjacent end of the valve 39 and move said valve a distance sufficient to effect communication within the casing C at the opposite sides of the plunger or piston head 37. This will result in a release of the air pressure, said air passing to the atmosphere through the port 78 in the wall of the casing C adjacent the forward end thereof or at a point in close proximity to the head 30. It is to be understood that after the brakes have been set by the air pressure, the valve 48 is moved into closed position.

When the brakes are to be released, the motor is reversed, resulting in a rearward movement of the nut or head 27 and as said nut or head 27 moves rearwardly, the spring 42 will move the valve 39 into its normal or closed position. The slot 35 in the piston 34 permits the desired outward movement of the piston 19 to move the valve 39 into its released position.

As hereinbefore stated, the locking of the flange or gear 8 results in the rotation of the shaft 1 in one direction to cause the shaft S to adjust the brake into set position and in which operation the piston 19 is moved in a direction to cause the disc or plate 9 to come in contact or seat itself against the head 12 of the member A with sufficient resultant friction to hold the disc or plate 9 and the flange or gear 8 carried thereby from rotating when making a release application. When the brake is in full release, the disc or plate 9 and head 12 do not have such clutching contact so that the flange or gear 8 is free to rotate and to permit said flange or gear 8 to idle in a neutral position. By reverse rotation of the motor, the flange or gear 8 revolves in the opposite direction until the rollers 16 become effective. At this time, the nut or head 27 moves outwardly on the shaft S.

From the foregoing description it is thought to be obvious that a brake constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A device of the class described comprising a shaft, a member in threaded engagement with said shaft, a driving shaft, a head fixed to the first named shaft, a plate mounted upon the driving shaft, gears carried by and positioned between the head and plate, a pinion carried by the driving shaft with which the gears mesh, a second plate loosely mounted upon the driving shaft and provided with an orbit gear with which the gears mesh, and a clutching means coacting with the second named plate for normally holding the same against rotation.

2. A device of the character described comprising a shaft, a member in threaded engagement therewith, a motor for rotating the shaft to impose push or pull upon the member, a shackle associated with the member, means operable by fluid pressure for imposing movement to the shackle in one direction, and means operated by the member upon movement in one direction to release the fluid pressure.

3. A device of the character described comprising a shaft, a member in threaded engagement therewith, a motor for rotating the shaft to impose push or pull upon the member, a shackle associated with the member, means operable by fluid pressure for imposing movement to the shackle in one direction, and fluid compression means operated by the motor.

4. A device of the character described comprising a shaft, a member in threaded engagement therewith, a motor for rotating the shaft to impose push or pull upon the member, a shackle associated with the member, means operable by fluid pressure for imposing movement to the shackle in one direction, fluid compression means operated by the motor, and means for rendering the fluid compression means inoperative when the fluid reaches a predetermined degree of pressure.

5. A device of the character described comprising, in combination, a member supported for reciprocatory movement, motor driven means for imparting movement to said member, means operable by fluid pressure for imparting movement to said member, and means operated by the motor driven means for releasing the fluid pressure.

6. In combination with the fulcrum bar of a brake mechanism, motor driven means for imparting movement to said bar, and fluid pressure means for imparting movement to said bar, said motor operated means and fluid pressure operated means being provided with coacting means whereby the fluid pressure is released by the motor operated means.

7. A device of the character described comprising an elongated member supported for endwise movement, motor driven means for imparting endwise movement thereto, a tubular member surrounding said elongated member, said first named member and tubular member having endwise movement one independently of the other, and means operable by fluid pressure for imparting endwise movement to the tubular member.

8. A device of the character described comprising an elongated member supported for endwise movement, motor driven means for imparting endwise movement thereto, a tubular member surrounding said elongated member, said first named member and tubular member having endwise movement one independently of the other, means operable by fluid pressure for imparting endwise movement to the tubular member, and means operable upon independent movement of the first named member for releasing the fluid pressure.

9. A device of the character described comprising a casing, a member operatively supported thereby and extending therein, said member having endwise movement, means for imparting endwise movement thereto, a tubular member surrounding the first named member and having endwise movement, a piston carried by the tubular member and coacting with the casing, and means for admitting fluid under pressure within the casing at one side of the piston for imparting movement to the tubular member in one direction independently of the first named member.

10. A device of the character described comprising a casing, a member operatively supported thereby and extending therein, said member having endwise movement, means for imparting endwise movement thereto, a tubular member surrounding the first named member and having endwise movement, a piston carried by the tubular member and coacting with the casing, means for admitting fluid under pressure within the casing at one side of the piston for imparting movement to the tubular member in one direction independently of the first named member, the interior of the casing at the opposite side of the piston being provided with an eduction port, said piston being provided with a port communicating with the interior of the casing at opposite sides of the piston, a normally closed valve coacting with the port, and means for opening said valve.

11. A device of the character described comprising a casing, a member operatively supported thereby and extending therein, said member having endwise movement, means for imparting endwise movement thereto, a tubular member surrounding the first named member and having endwise movement, a piston carried by the tubular member and coacting with the casing, means for admitting fluid under pressure within the casing at one side of the piston for imparting movement to the tubular member in one direction independently of the first named member, the interior of the casing at the opposite side of the piston being provided with an eduction port, said piston being provided with a port communicating with the interior of the casing at opposite sides of the piston, a normally closed valve coacting with the port, and means carried by the first named member and coacting with the valve upon movement of the first named member in one direction for moving said valve into open position.

In testimony whereof I hereunto affix my signature.

ROBERT Z. FARMER.